United States Patent
Scarpino et al.

(10) Patent No.: US 6,717,987 B1
(45) Date of Patent: Apr. 6, 2004

(54) VIDEO COMPRESSION METHOD AND APPARATUS EMPLOYING ERROR GENERATION AND ERROR COMPRESSION

(75) Inventors: Anthony D. Scarpino, Scarborough (CA); Arshad S. Rahman, Maple (CA)

(73) Assignee: ATI International SRL, Barbados (BB)

( * ) Notice: Subject to any disclaimer, the term of this patent is extended or adjusted under 35 U.S.C. 154(b) by 0 days.

(21) Appl. No.: 09/564,963

(22) Filed: May 4, 2000

(51) Int. Cl.[7] .................... H04N 7/12; H04N 7/01; G06K 9/36
(52) U.S. Cl. ................... 375/240.03; 375/240.27; 382/166; 348/450
(58) Field of Search ............. 375/240.03, 240.17, 375/240.01, 240.27; 348/458, 796, 68, 396.1, 450, 444, 489; 382/166, 298

(56) References Cited

U.S. PATENT DOCUMENTS

| | | | |
|---|---|---|---|
| 4,716,453 A | * 12/1987 | Pawelski | 375/240.01 |
| 4,951,139 A | * 8/1990 | Hamilton et al. | 375/240.07 |
| 5,585,868 A | * 12/1996 | Crosby | 348/796 |
| 5,684,538 A | * 11/1997 | Nakaya et al. | 375/240.17 |
| 5,920,659 A | * 7/1999 | Iverson et al. | 382/298 |
| 6,021,216 A | * 2/2000 | Sathe et al. | 382/166 |
| 6,580,461 B2 | * 6/2003 | Chambers et al. | 348/458 |

* cited by examiner

*Primary Examiner*—Gims Philippe
(74) *Attorney, Agent, or Firm*—Vedder, Price, Kaufman & Kammholz, P.C.

(57) ABSTRACT

A method and apparatus compresses digital information based on an interpolation function such as used by a graphic engine scaler. Luma error information is determined based on the interpolation function and original luma data. A luma error quantizer quantizes the luma error information to determine a quantized error value on a per pixel basis. The quantized luma error value is compressed as part of compressed video information. In addition, chroma information is also compressed and combined with the compressed luma and compressed error information. The video compression method and apparatus stores compressed digital luma information, compressed digital chroma information, and compressed quantized error information (values) as the compressed video information on a per frame basis.

27 Claims, 5 Drawing Sheets

VIDEO COMPRESSION METHOD AND APPARATUS EMPLOYING ERROR GENERATION AND ERROR COMPRESSION

FIELD OF THE INVENTION

The invention relates generally to methods and apparatus for compressing video data, and more particularly to methods and apparatus for compressing digital video and/or audio information.

BACKGROUND OF THE INVENTION

Multimedia computer systems, hand held Internet appliances and other video display devices are being developed which can capture broadcast quality video at full frame rates. Traditionally, it has been very difficult to achieve full frame rate capture and playback due to high data bandwidth requirements. Three primary bottlenecks include hard drive transfer rates (with, for example, multimedia computer systems), processor power of a central processing unit (CPU) and system bus throughput between the CPU and a video processor or other video capture device. In addition, the enormous amounts of raw data in the audio and video streams requires large amounts of storage capacity.

One solution to dealing with these bottlenecks and limitations has been to use dedicated hardware video compression chips to process the video and greatly reduce the bandwidth requirements. These dedicated chips can typically use motion JPEG or wavelet compression techniques to reduce the raw video from, for example, 18 megabytes/second to around 2 megabytes/second. The dedicated chips can then provide a mechanism for overcoming the issue of bus speed, hard drive transfer rate and disk space requirements. The ability of the dedicated compression chip to compress the video frames asynchronously and independently of the host processor, solves the issue of processing power.

However, drawbacks to using dedicated video compression chips include the cost of the actual ASIC as well as the cost of laying the ASIC out on a video card or other printed circuit board.

It is also known in multimedia computer systems and other videographics processing devices to employ a graphics processing chip or central processing unit with a graphics processing chip for use in displaying video, recording video and playing back video and audio information. It becomes difficult with higher resolution video, such as 640 by 480 and higher, to record video to a hard drive for storage due to the bandwidth requirements. If flames are not recorded and digitized, a person's eye can detect dropped frames. Other solutions have been to reduce the record and playback resolution. However, this also results in poor image quality. Some video capture systems that employ a JPEG encoding and/or decoding processor often also require a lot of overhead thereby reducing system performance. Other video encoding formats, such as MPEG, utilize a different approach that includes, among other things, the use of key frames and the use of delta frames from which final frames can be reconstructed. However, the receiving of raw or precompressed information requires a suitable compression operation to afford a cost effective product. Moreover, JPEG encoding can result in losses of low frequencies. Accordingly, when a video image is reconstructed, there can be artifacts along block edges during video playback. Accordingly, MPEG and JPEG encoding can suffer from DCT blocking artifacts since these are block-based lossy encoding approaches. Wavelet compression is also a known video compression technique that requires processor intensive operations thereby greatly impacting system performance.

Video information is typically stored as digital luma and digital chroma information. One known type of chroma compression occurs in known videographics processors that convert, for example, YCbCr data to YUV9 format. However, such systems typically do not compress luma information. 3D graphics processing engines and other graphics processors often perform a type of compression technique when converting YCr Cb data to a YUV9 format. For example, such a conversion typically leaves the luma data effectively uncompressed and reduces chroma information (Cr and Cb) as a type of compression technique. This can reduce video storage requirements by reducing information to 56% of its original size. However, this reduction is typically not enough for high resolution video display and compression of relatively uncompressed video information.

Graphics processors are also known that employ overlay engines which allow an image to be overlaid on top of another image for display on a monitor or screen. Such overlay engines typically employ one or more scalers which scale pixel information linearly to reduce the size of a window, for example. Such linear scaling, however, to provide image sizing can be a lossy scaling procedure when, for example, reducing the size of an image from its original size down to a smaller scaled size. In addition, scalers are used to interpolate and increase the image size and in such systems allow interpolation of additional pixels to occur in both the horizontal and vertical directions.

Accordingly, a need exists for a video compression method and apparatus that provides storage of images that have little visual degradation, on a frame by frame basis. In addition, it would be desirable if such a method and apparatus used common hardware components to allow implementation in a cost effective manner on conventional multimedia platforms.

DETAILED DESCRIPTION OF A PREFERRED EMBODIMENT OF THE INVENTION

A method and apparatus compresses digital information based on an interpolation function such as used by a graphic engine scaler. Luma error information is determined based on the interpolation function and original luma data. A luma error quantizer quantizes the luma error information to determine a quantized error value on a per pixel basis. The quantized luma error value is compressed as part of compressed video information. In addition, chroma information is also compressed and combined with the compressed luma and compressed error information and. The video compression method and apparatus stores compressed digital luma information, compressed digital chroma information, and compressed quantized error information (values) as the compressed video information on a per frame basis.

In one embodiment, a scaling algorithm (i.e., interpolation function) of a hardware based scaler in a video graphics processor is used to determine the luma error terms in order to reconstruct the compressed video information. Accordingly a front end scaler that is, for example, in a conventional graphics processor is used for video compression and/or decompression. Or if desired, a conventional back end overlay scaler may be used, for example, for video decompression. To get a larger reduction in luma information, the error factor is quantized and further compressed, if desired.

Accordingly, a compression scheme is disclosed that effectively breaks up luma and chroma compression using distinct compression mechanisms. For chroma information, for example, YCr and Cb chroma data is converted to YUV9 format which provides, for example, an immediate reduction into 56% of the original image size without significant image degradation. A second compression mechanism is used to reduce the luma information by using dynamic interleaved pixel error prediction by a processor, 3D graphics engine or suitable arithmetic logic unit. Interleaved (i.e., interpolated) pixels are predicted with a high degree of accuracy compared to original pixel values. Often alternate pixels can be effectively thrown away and on decompression, the predicted value can be improved by applying the error term if the predicted value is incorrect. The error predictions are generally accurate within a given threshold so that the set of errors is very small. Using the hereindescribed method and apparatus, a video frame can be reduced to between 19% and 23% of its original size.

Varying levels of compression and image quality can be varied by varying the threshold value for the error term quantization.

Figure 1:
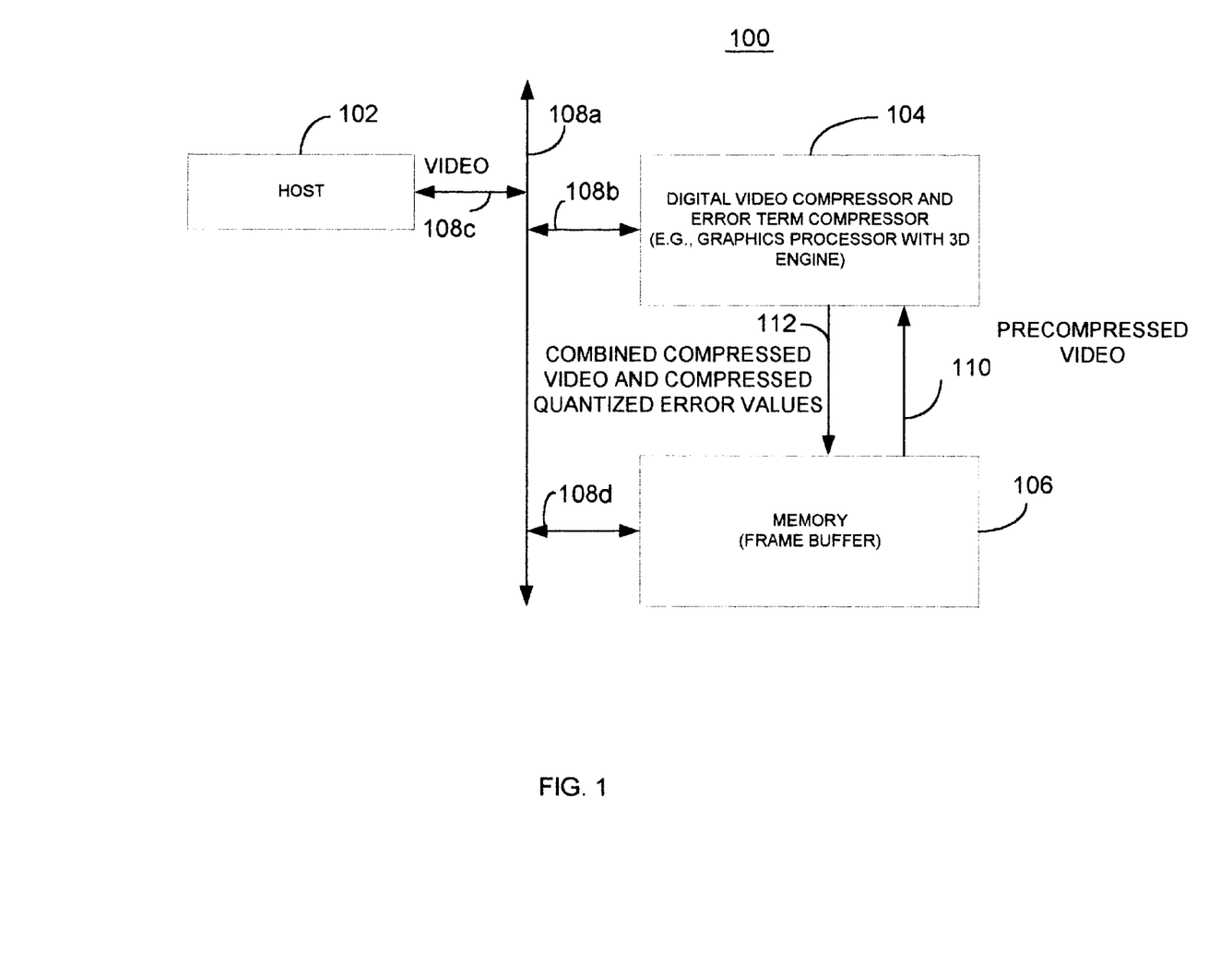
FIG. 1 is a block diagram illustrating one example of an apparatus that provides digital video compression in accordance with one embodiment of the invention.

FIG. 1 illustrates a block diagram of a multimedia system 100 employing a host processor 102, a digital video compression and error term compressor 104 and memory 106, such as a frame buffer. The host processor 102 is in operative communication with the digital video compressor and error term compressor 104 and memory 106 through one or more buses generally indicated as 108a–108d. The multimedia system 100 may be employed, for example, in any suitable device such as an Internet appliance, laptop computer, desktop multimedia computer system or any other suitable device. The digital video compressor and error term compressor 104 may be a suitably programmed graphics processing engine that employs a scaler, or any other suitable data processing device.

In this embodiment, raw video, such as analog video from a satellite or cable feed, is received by the host processor through a suitable analog video source. The precompressed analog video may be suitably passed to the digital video compressor and error term compressor 104 through bus 108b where it is converted from an analog source to a digital domain using a conventional video decoder. Typically, the video decoder, such as the SAA7112 available from Phillips Semiconductor converts the data to the YCbCr format. As known in the art, this format represents each video pixel as luminance (brightness) and chrominance (color) values, as opposed to the traditional red, green and blue (RGB) color space. YCbCr was developed as part of the ITU-R BT 601 standard with Y standing for the luma, Cb representing the color difference between blue and Y, and Cr denoting the color difference between red and Y. For purposes of discussion, as described herein, YCbCr may also be referred to as YUV even though YUV traditionally represents an unscaled value being from 0–255, whereas YCbCr scales and clamps the luma to a range between 16–235 and the chroma to a range of 216–240. The video decoder previously mentioned may simply perform analog to digital conversion or any other suitable decoding.

As known in the art, instead of associating eight bits for each of the Y, U and V components for every video pixel (known as YUV4:4:4), the video decoder subsamples the chrominance data so that every two Y pixels share one U and a V sample. This format, known as YUV4:2:2, allows each pixel to be represented in 16 bits as opposed to twenty-four bits. When calculating the RGB pixel, the same shared U and V values can be used for both Y pixels, or the value can be interpolated for the second pixel based on the following U/V sample.

The digital video compressor and error term compressor 104 having the video decoder, stores the precompressed digital video 110 into memory 106. This digital information is then suitably compressed as described herein as combined compressed video and compressed quantized error values 112.

Figure 2:
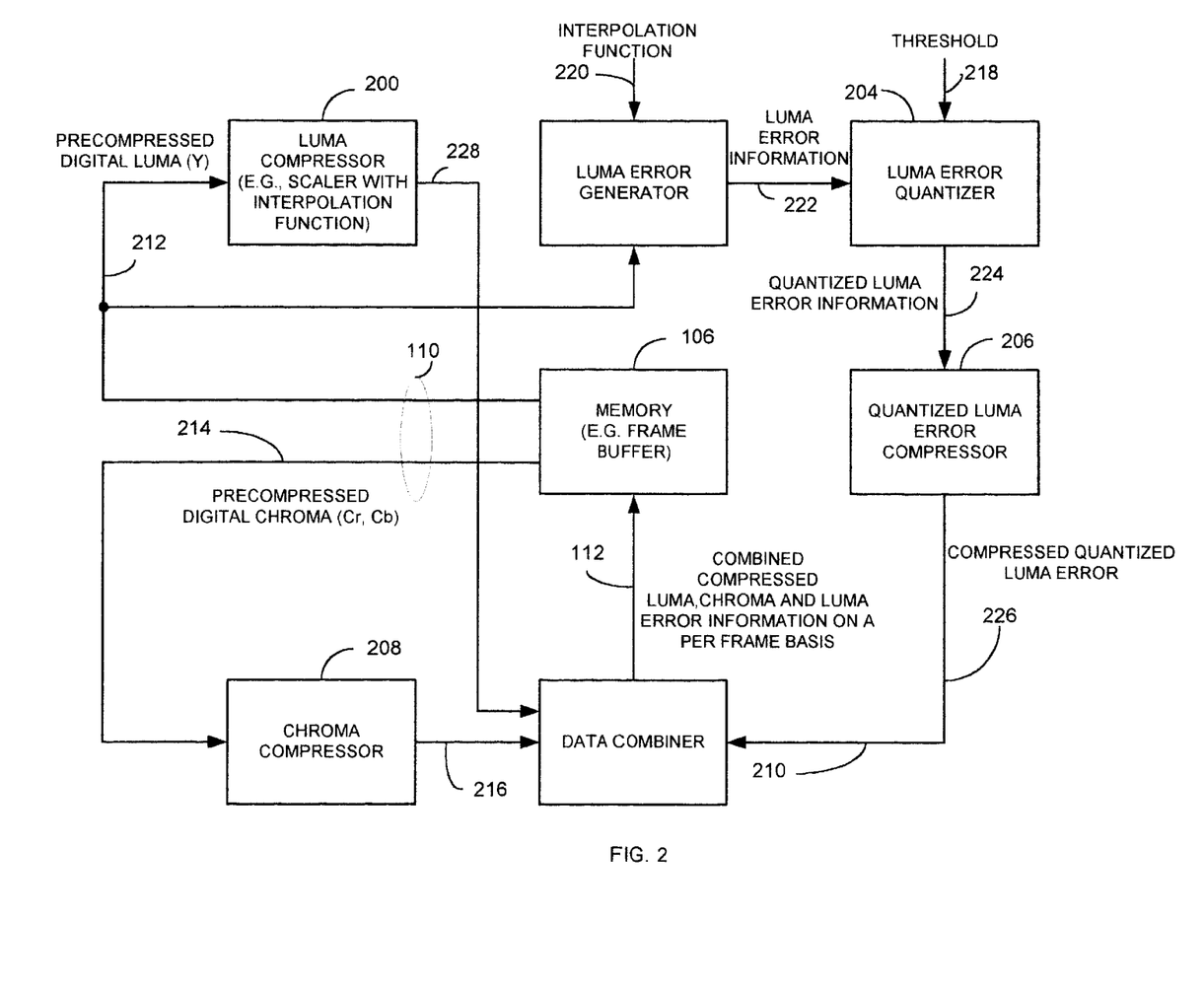
FIG. 2 is a block diagram illustrating one example of an apparatus for compressing video in accordance with one embodiment of the invention.

As shown in FIG. 2, the digital video compressor and error term compressor 104 which may be a suitably programmed graphics processor with a scaler, is represented as a number of blocks (except for the memory) that may implemented in hardware, but is preferably functionally embodied via software control of a suitable processing device, such as a graphics processor, general purpose processor, digital signal processor or any other suitable hardware. The digital video compressor and error term compressor 104 includes a luma compressor 200, a luma error generator 202, a luma error quantizer 204, a quantized luma error compressor 206, a chroma compressor 208 and a data combiner 210. The luma compressor 200 may be incorporated as a portion of a graphics engine scaler with an interpolation function (such as a decimation algorithm or inverse decimation algorithm), for example, that decimates or interpolates by a factor of 2. Another processor, such as a coprocessor or host processor may also be used to perform the error generation function. However, it will be recognized that any suitable interpolation function may be used. The luma compressor 200 receives precompressed digital luma data 212 that was stored in memory 106 by video decoder.

Likewise, the chroma compressor 208 receives precompressed digital chroma information 214 (digital Cr and digital Cb). The luma compressor 200 is operative to compress digital luma information 212 on a per pixel basis based on the interpolation function. The chroma compressor 208 is operative to compress digital chroma information resulting in compressed chroma information 216. The chroma compressor compresses digital chroma information 214 using, for example, a YUV9 algorithm as known in the art. However, it will be recognized that any other suitable chroma compression technique can be used.

The luma error generator 202 is operative to determine luma error information on a per pixel basis, based on interpolation function 220 used by the luma compressor 200. The luma error generator also receives the precompressed luma information 212. The luma error generator 202 generates the luma error information 222 for output to the luma error quantizer 204.

The luma error quantizer 204 quantizes the luma error information 222 on a per pixel basis, for example, to determine a quantized luma error information 224 value (or set of values) on a per pixel basis. The error can be zero. In one embodiment, the luma error quantizer 204 dynamically determines on a per pixel basis, each quantized luma error value based on the quantization threshold 218. The luma error quantizer is responsive to the quantized threshold 218.

The quantized luma error compressor 206 receives the quantized luma error information 224 and compresses the quantized luma error information as part of compressed video information 112 to produce compressed quantized luma error value 226. The quantized luma error compressor 206 compressor compresses the quantized luma error information 224 using, for example, a run length encoding algorithm. However, any suitable algorithm may be used.

The data combiner 210 combines the compressed chroma information 216, compressed luma information 228, from the luma compressor 200, and the compressed quantized luma error 226 associated with the representative pixels. The data combiner 210 combines the received quantized luma error value compressed chroma information and the compressed luma information 228 to produce the combined compressed chroma and luma error information which is then stored in memory 106. Hence the memory, such as the frame buffer 106, contains compressed digital luma information 112, compressed digital chroma information and compressed quantized luma error value 226 as the compressed video information on a per frame basis. The combined compressed luma and chroma and luma error information is provided on a per frame basis.

The luma error generator 202 determines the luma error information 222 by at least comparing an actual pixel luma value from the precompressed digital luma information 212 with a predicted luma pixel value generated based on the interpolation function 220. The resulting error serves as luma error information on a per pixel basis. In one embodiment, the interpolation function is an averaging function which averages adjacent pixels from one or more lines. However, any suitable interpolation function can be used.

Figure 3:
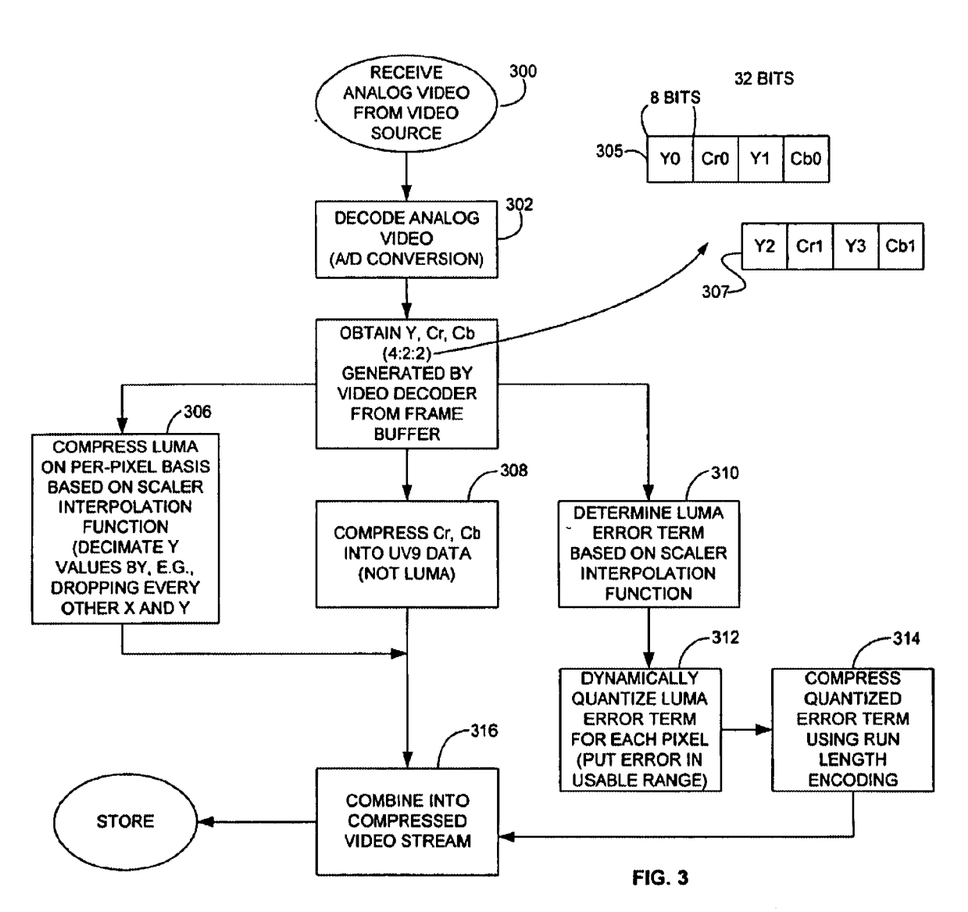
FIG. 3 illustrates one method for compressing video in accordance with one embodiment of the invention.

FIG. 3 illustrates one example of a method for video compression in accordance with one embodiment of the invention. The method will be described for illustrative purposes, and not limitation, with respect to FIG. 2. However, it will be recognized that the method may be incorporated and carried out by any suitable hardware, software, combination of hardware and software, or any other suitable mechanism. As shown in block 300, the method includes receiving analog video from a video source. The analog video is then decoded as shown in block 302 by a suitable video decoder through an analog to digital conversion or any other suitable conversion. The resulting precompressed digital video data may be then stored in suitable memory. As shown in block 304, the method includes obtaining the precompressed digital information which may be in the form, for example, of YCrCb data generally shown as 305 and 307. As shown in FIG. 3, the processes of blocks 306, 308 and 310 may be performed in parallel or in any other suitable order, as desired.

Figure 5:
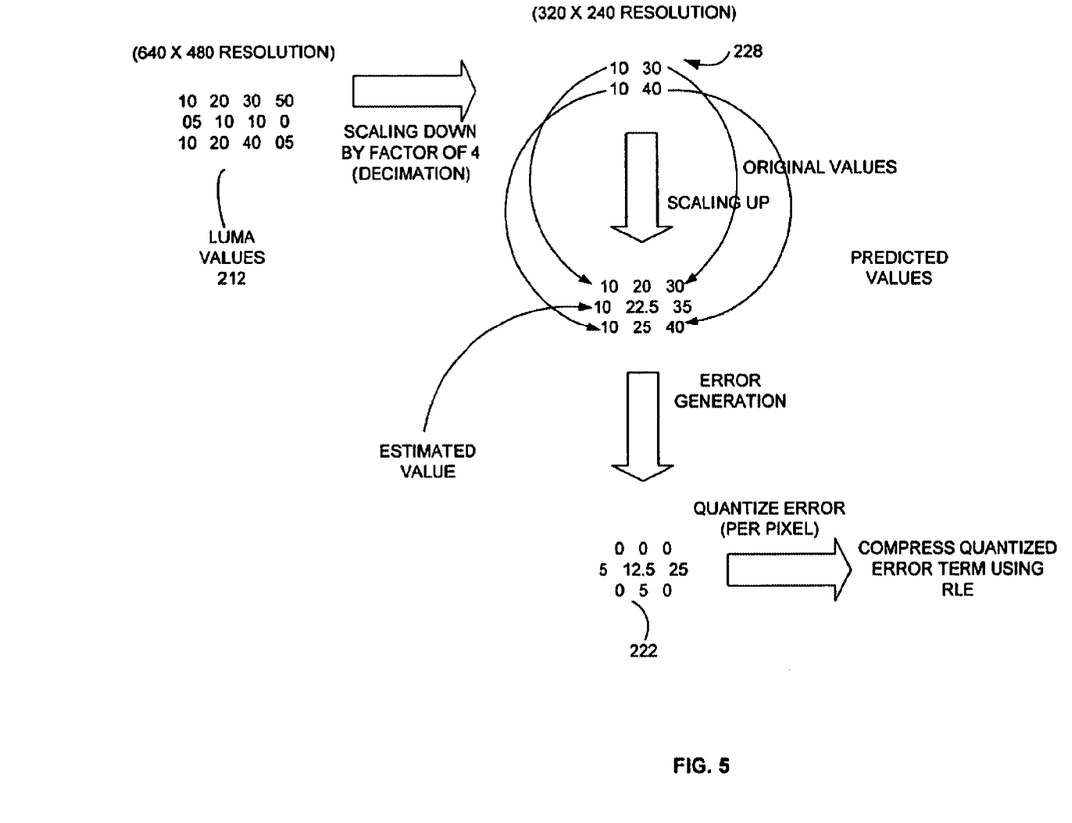
FIG. 5 is a diagram illustrating steps in performing video compression in accordance with one embodiment of the invention.

As shown in block 306, the method includes compressing digital luma information on a per pixel basis based on an interpolation function. Referring to FIG. 5, this may be represented by precompressed digital luma values 212, which are scaled down by a factor of four through a decimation algorithm to provide, for example, a reduction of resolution of 640 by 480 to a resolution of 320 by 240. The resulting compression which may be carried out, for example, by a suitably programmed video graphics scaler results in compressed luma data 228.

Since luminance changes are obvious to the human eye, the disclosed methods and apparatus attempt to maintain as much of the original data as possible. Accordingly, a different technique is performed on the luma data than is applied to the chroma data. It has been found that there is a strong correlation of the original image to one that is a quarter of the size if expanded using filtering to interpolate the unknown pixels. By applying an error term to the pixels that do not match, it is possible to quickly get back the original image. For example, as shown in FIG. 5, the scaling up of scaled down information results in original values being retained with estimated values for intermediate pixels being slightly different or equal to the original precompressed digital luma values 212. The luma error information 222 illustrates that the errors between the predicted and actual data fall within a small range. Other luminance samples that drastically vary from an original prediction will have large delta values. Since the objective is to maintain the visual integrity of the original image, the smaller delta error terms are quantized with little perceptible quality loss.

For example, as shown in block 310, the method includes determining the luma error term 222 on a per pixel basis based on the scaler interpolation function. For example, the predicted values are generated by using an inverse of the scaling down or interpolation function. The difference between the predicted values for each pixel with the original precompressed digital luma data 212 results in the per pixel error values 222.

As shown in block 312, the method includes quantizing the luma error values 212 on a per pixel basis for each pixel. For example, the error is put in a usable range before being stored. The quantized error values are then compressed as shown in block 314 by applying a run length encoding (RLE) algorithm to the error terms. For those images that do not have a large amount of motion, run length error encoded error term is usually in a small range of about 10 k–15 k. For those frames with considerable inter-field motion, there are a higher percentage of large delta values and the compressed values may be in the 20–25 k range. Accordingly, both the image data and error terms are compressed resulting in further compression and storage savings.

As shown in block 308, the method also includes performing chrominance data compression by converting, for example, data from YUV4:2:2 to YUV9 format. This may be performed as known in the art. For example, a transformation of the data which is in the packed format with the U and V interleaved with the Ys (YUYV) (see FIG. 3, 305 and 307) the data transformed to a planar format where each of the Y, U and V data planes are stored separately. The resulting data, as known in the art, is known as the compressed chroma information 216. As shown in block 316, the method includes combining compressed digital luma information, and quantized luma error values, whether compressed or not, as compressed video information on a per frame basis.

Error term generation carried out, for example, by the luma error generator 202 may be as follows. For the odd scan lines, the method includes averaging the intermediate values for every alternate pixel and subtracting it from the actual value represented as $E_n = Y_n$ x, where E is the error term and $Y_n$ x is the original luma value of an x component of the pixel.

The even scan lines may be determined differently. For example, instead of interpolating a value between two other interpolated pixels, thereby increasing the chance of error, a vertical averaging between two known Y values may be performed. This additionally helps maintain any interfield motion because on decompression the intermediate pixel is calculated based on the error corrected Y terms horizontally and not from an average of two interpolated Y terms vertically. The benefit of this may also be that it is less computationally expensive since only one average calculation needs to be performed instead of three with fewer memory accesses.

For example, for luma values:

$Y_{00}Y_{01}Y_{02}Y_{03}Y_{04}Y_{05}Y_{06}Y_{07}\cdots$
$Y_{10}Y_{11}Y_{12}Y_{13}Y_{14}Y_{15}Y_{16}Y_{17}\cdots$
$Y_{20}Y_{21}Y_{22}Y_{23}Y_{24}Y_{25}Y_{26}Y_{27}\cdots$
$Y_{30}Y_{31}Y_{32}Y_{33}Y_{34}Y_{35}Y_{36}Y_{37}\cdots$, The following equations may be used.

| Odd scanline calculations: | Even scanline calculations: |
| --- | --- |
| $E_{01} = Y_{01} - ((Y_{00} + Y_{02})/2)$ | $E_{11} = Y_{10} - ((Y_{00} + Y_{20})/2)$ |
| $E_{03} = Y_{03} - ((Y_{02} + Y_{04})/2)$ | $E_{12} = Y_{02} - ((Y_{02} + Y_{22})/2)$ |

Once the error terms are calculated, quantization of the error terms takes place. The luma error quantization allows the adjusting of the quantization threshold 218 from a default to a higher or lower value. Accordingly, different variable compression ratios can be obtained. For example, if it is desired to implement an upper bounds or relative fixed bit rate compression mechanism a dynamic adjustment of the quantization level based on a count of the error terms can be used. By dynamically calculating the appropriate threshold value on a per frame basis, the number of error terms can be increased or decreased, thereby allowing the operation to maintain a fixed compressed frame size. In order to calculate the optimal threshold level, a statistical profile, such as a histogram, of the error values is generated. This may be accomplished in an efficient manner by increasing a counter whose index is equivalent to a histogram level during a calculation of the error terms. With this information in hand, one can start adding the counters from both ends (+127 and −128) and working inwardly. Once the threshold is hit, for example after 20,000 occurrences, the method can include using the previous index as the quantization level. This may insure that there will not be more than this number of nonzero error terms. Accordingly, a method for dynamically determining a quantization threshold on a per frame basis includes generating a statistical profile of the error values; narrowing an error value range until a desired boundary of range that includes a desired amount of error term data is collected; and selecting the boundary of range as a quantization threshold.

It has been found that quantization levels below +7 or −7 can result in large numbers of non-zero delta whenever levels above ±25 can introduce visible quality loss without significant reduction in the number of zeros. It will be noted that decrease in the quantization level through the threshold 218 increases the number of non-zero terms in a nonlinear fashion since the majority of predicted values are close to the actual luminous levels. The run length encoding mechanism is a specialized version to take advantage of the large runs of zeros that are generated by the quantization phase. Only values of zero have a marker to indicate a run. All non-zero values are written out normally without any type of compression. This method can actually generate a compressed block larger than the original if there are very short runs of zero's since each occurrence requires a separate marker byte. By properly setting the threshold values chosen for the quantization phase, this scenario does not occur since a source with large strings of zeros is used, thereby guaranteeing optimal compression.

It will be recognized that dynamic quantization adjustment need not be performed but that the run length encoding can be performed at the same time the error term is calculated. For example, for dynamic determination of the quantization threshold 218, the idea is to obtain a fixed amount of error term information. Based upon the amount of motion in an original source frame, the error term size can vary. By adjusting the error threshold up or down the error term size can be fixed. One way to calculate the threshold may be to establish an array initially cleared to zero and where the array is of the size 255. For every error term value, an increment of the corresponding index in the array (e.g., as by incrementing a counter as noted above) is done. This indicates how many times that error value has occurred in the frame. Once an entire frame of error terms are calculated, index values are added inwardly from the ends (from plus and minus 127).

Once the amount of the fixed error data is exceeded, the previous index value is used as a threshold value to apply during the quantization phase.

The quantization of error means that the error term value on a per pixel basis is taken and all values below a given threshold are dropped. A typical quantization threshold may be +15. This quantization process results in large regions of zero values which can be highly compressed using simple and fast run length encoding.

Figure 4:
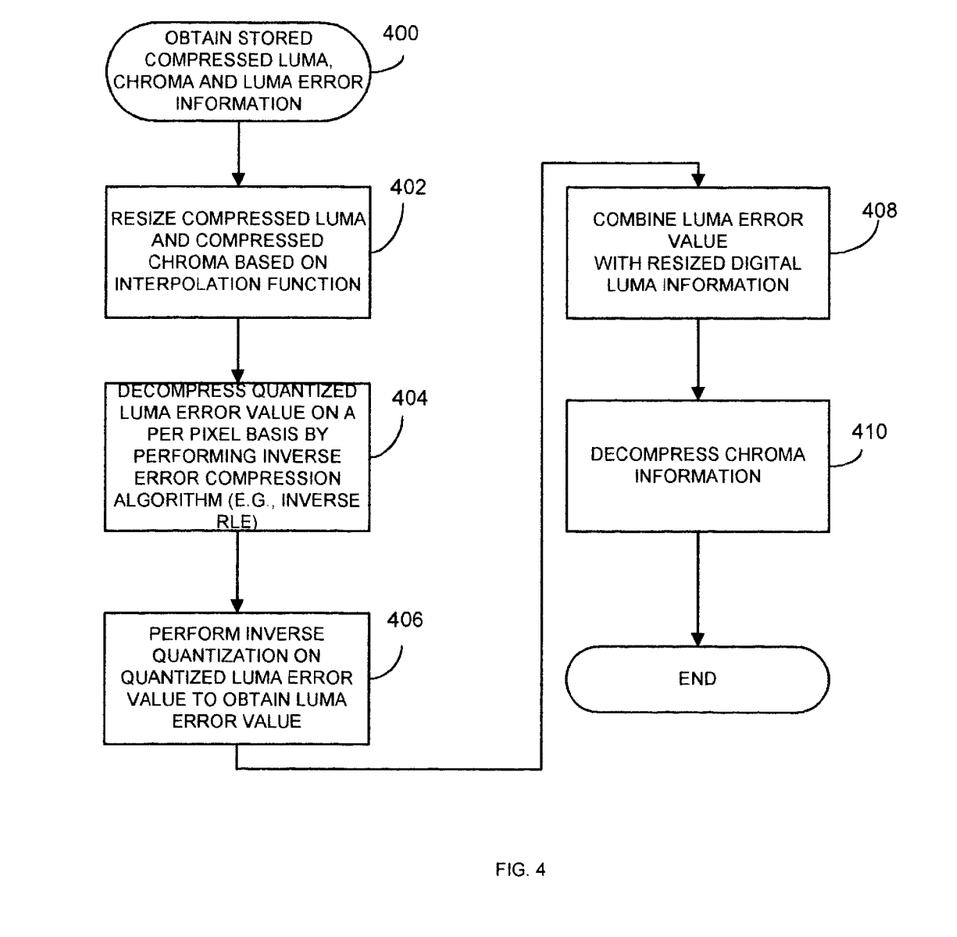
FIG. 4 is a flowchart illustrating one example of a method for decompressing video in accordance with one embodiment of the invention.

Referring to FIG. 4, after compression, decompression occurs to playback the stored images. A method for decompression includes the step of obtaining the stored compressed luma chroma and luma error information as shown in block 400. The decompression method includes resizing the compressed luma based on the interpolation function as shown in block 402 and resizing the compressed chroma. The chroma is resized in the hardware overlay by interpolating the unknown intermediate values via averaging of the known values. As shown in block 404, the method includes decompressing the quantized luma error value on a per pixel basis by performing an inverse error compression algorithm, for example, by applying an inverse run length encoding algorithm to the quantized luma error value. As shown in block 406, the method includes performing an inverse quantization on quantized luma error values to obtain the luma error value. As shown in block 408, the method includes combining the luma error value with the resized digital luma information. As shown in block 410, the method includes decompressing the chroma information to get the original chroma data.

In an alternative embodiment, instead of having a software based error generator, a 3D graphics engine can perform a subtractive blit operation to determine the per pixel error. For example, the original frame serves as a source image texture. A scaler down scales the image. A scaling up and blend operation is performed to generate a second texture. Each of the pixels from the two textures are subtracted resulting in error values forming the error terms.

Accordingly, the method and apparatus provides improved compression and uses two different compressing mechanisms, one for luma data and one for chroma data. Error terms based on predicted and actual luma values are quantized and subsequently compressed to further reduce storage requirements of the video data since the compressed quantized error terms are stored with compressed luma and compressed chroma information in the frame buffer or other suitable memory. The method may be carried out through a software program by controlling a suitable processing device such as a graphics processor or other general purpose processing device. The scaler structure of a graphics processor is suitably used to provide the compression of the luma information thereby taking advantage of existing hardware.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A video compression method comprising the steps of:
   compressing digital luma information by performing an interpolation function;
   determining luma error information based on the interpolation function;
   quantizing the luma error information to determine a quantized luma error value on a per pixel basis; and
   compressing the quantized luma error value as part of compressed video information;
   wherein the compressing digital luma information, the determining luma error information, the quantizing the luma error information and compressing the quantized luma error value is performed in a graphics processor with a scaler.

2. The method of claim 1 including the step of compressing digital chroma information to produce compressed digital chroma information.

3. The method of claim 2 including the step of storing the compressed digital luma information, compressed digital chroma information and the quantized luma error value as the compressed video information on a per frame basis.

4. The method of claim 1 including the step of:
   decompressing the stored compressed video information by:
   resizing the compressed luma and compressed chroma information based on the interpolation function;
   decompressing the quantized luma error value;
   performing inverse quantization on the quantized luma error value to obtain the luma error value; and
   combining luma error value with resized digital luma information.

5. The method of claim 2 wherein the step of compressing digital chroma information is done using a UV9 algorithm.

6. The method of claim 1 wherein the step of compressing the quantized error luma value includes using run length encoding.

7. The method of claim 1 including the step of determining each quantized luma error value based on a quantization threshold.

8. The method of claim 1 wherein the step of determining luma error information includes comparing an actual per pixel luma value and a predicted luma value generated by an interpolation function.

9. The method of claim 1 wherein the interpolation function is an averaging function.

10. The method of claim 7 including the step of dynamically determining the quantization threshold on a frame by frame basis by generating a statistical profile of the error values; narrowing an error value range until a desired boundary of range that includes a desired amount of error term data is collected; and selecting the boundary of range as a quantization threshold.

11. A video compression apparatus comprising:
    a luma error quantizer, operatively coupled to the luma error generator that quantizes the luma error information to determine a quantized luma error value on a per pixel basis; and
    an error compressor operatively coupled to the luma error quantizer to compress the quantized luma error value as part of compressed video information;
    wherein the luma error quantizer and the error compressor are executed in a graphics processor with a scaler.

12. A method for compressing video comprising the steps of:
    using a video graphics processor with a scaler to:
    compress digital luma information based on a n interpolation function;
    determine luma error information based on the interpolation function;
    quantize the luma error information to determine a quantized luma error value on a per pixel basis; and
    compress the quantized luma error value as part of compressed video information.

13. The apparatus of claim 11 including:
    a chroma compressor operative to compress digital chroma information; and
    a data combiner operatively coupled to the chroma compressor, the luma compressor and the error compressor, that combines a received compressed quantized luma error value, the compressed chroma information and the compressed luma information.

14. The apparatus of claim 13 including memory, operatively coupled to the data combiner, containing compressed digital luma information, compressed digital chroma information and the compressed quantized luma error value as the compressed video information on a per frame basis.

15. The apparatus of claim 13 including:
    a decompressor operatively coupled to the memory that resizes the compressed luma and compressed chroma information based on the interpolation function; decompresses the quantized luma error value; performs inverse quantization on the quantized luma error value to obtain the luma error value; and combines the luma error value with resized digital luma information.

16. The apparatus of claim 13 wherein the chroma compressor compressing digital chroma information using a UV9 algorithm.

17. The apparatus of claim 11 wherein the error compressor compresses the quantized error luma value using run length encoding.

18. The apparatus of claim 11 wherein the luma error quantizer determines each quantized luma error value based on a quantization threshold.

19. The apparatus of claim 11 wherein the luma error generator determines luma error information by at least comparing an actual per pixel luma value and a predicted luma value generated based on the interpolation function.

20. The apparatus of claim 11 wherein the interpolation function is an averaging function.

21. The apparatus of claim 18 including the step of dynamically determining the quantization threshold on a frame by frame basis by generating a statistical profile of the error values; narrowing an error value range until a desired boundary of range that includes a desired amount of error term data is collected; and selecting the boundary of range as a quantization threshold.

22. The method of claim 12 including the step of compressing digital chroma information to produce compressed digital chroma information.

23. The method of claim 22 including the step of storing the compressed digital luma information, compressed digital chroma information and the quantized luma error value as the compressed video information on a per frame basis.

24. The method of claim 23 including the steps of:
decompressing the stored compressed video information by:
resizing the compressed luma and compressed chroma information based on the interpolation function;
decompressing the quantized luma error value;
performing inverse quantization on the quantized luma error value to obtain the luma error value; and
combining luma error value with resized digital luma information.

25. The method of claim 22 wherein the step of compressing digital chroma information is done using a UV9 algorithm.

26. The method of claim 12 wherein the step of compressing the quantized error luma value includes using run length encoding.

27. The method of claim 12 including the step of determining each quantized luma error value based on a quantization threshold.

* * * * *